(12) United States Patent
Shintani

(10) Patent No.: US 7,480,518 B2
(45) Date of Patent: Jan. 20, 2009

(54) MOBILE COMMUNICATION TERMINAL AND METHOD OF CONTROLLING SIGNAL-TRANSMISSION POWER

(75) Inventor: Tatsuyuki Shintani, Tokyo (JP)

(73) Assignee: NEC Corporation, Tokyo (JP)

( * ) Notice: Subject to any disclaimer, the term of this patent is extended or adjusted under 35 U.S.C. 154(b) by 669 days.

(21) Appl. No.: 11/225,710

(22) Filed: Sep. 13, 2005

(65) Prior Publication Data

US 2006/0058055 A1 Mar. 16, 2006

(30) Foreign Application Priority Data

Sep. 15, 2004 (JP) ............................. 2004-268372

(51) Int. Cl.
*H04B 7/00* (2006.01)

(52) U.S. Cl. .................. 455/522; 455/67.13; 455/63.1; 455/76; 455/69; 455/67.11; 370/342; 370/479; 370/318; 370/320; 370/335

(58) Field of Classification Search .................. 455/76, 455/522, 69, 67.13, 67.11, 63.1; 370/342, 370/479, 318, 320, 335
See application file for complete search history.

(56) References Cited

U.S. PATENT DOCUMENTS 7,072,680 B2 * 7/2006 Lee et al. .................... 455/522

2001/0002905 A1 * 6/2001 Funamori .................... 370/342

FOREIGN PATENT DOCUMENTS

| JP | 2003-188815 | 7/2003 |
| JP | 2004-112097 | 4/2004 |
| JP | 2004-116916 | 4/2004 |
| JP | 2005-303670 | 10/2005 |

OTHER PUBLICATIONS

K. Kinoshita, "Easy IMT-2000", *Denki Tsushin Kyokai*, (2001).

* cited by examiner

*Primary Examiner*—Matthew D. Anderson
*Assistant Examiner*—April S Guzman
(74) *Attorney, Agent, or Firm*—Scully, Scott, Murphy & Presser, P.C.

(57) ABSTRACT

A mobile communication terminal includes a de-spreader which de-spreads signals received from a base station, a RAKE-synthesizer which RAKE-synthesizes the de-spread signals, a SIR detector which measures a SIR of the received signals, a SIR comparator which compares a SIR of the received signals to a target SIR, a quality detector which measures quality of the received signals at a predetermined interval, a quality comparator which compares the quality of the received signals, transmitted from that quality detector, with target quality, the quality comparator lowering the target SIR, if the quality of the received signals is higher than the target quality, and raising that SIR, if the quality of the received signals is lower than the target quality, and a controller which stores a minimum target SIR therein, and varies the minimum SIR in accordance with a relation between the target SIR and the quality of the received signals.

20 Claims, 9 Drawing Sheets

MOBILE COMMUNICATION TERMINAL AND METHOD OF CONTROLLING SIGNAL-TRANSMISSION POWER

BACKGROUND OF THE INVENTION

1. Field of the Invention

The invention relates to a mobile communication terminal and a method of controlling power at which a base station transmits signals to a mobile communication terminal, and more particularly to a W-CDMA (Wideband Code Division Multiple Access) type mobile communication terminal and a method of controlling power at which a base station transmits signals to a W-CDMA type mobile communication terminal.

2. Description of the Related Art

Various mobile communication terminals including a W-CDMA type mobile communication terminals have been suggested as a third-generation mobile communication terminal. A system for controlling power at which a base station transmits signals to a W-CDMA type mobile communication terminal is comprised of inner-loop control in which a mobile communication terminal transmits a request to a base station from which the mobile communication directly receives signals, to increase or reduce the power at a relatively short period of time (660 microseconds), and outer-loop control in which an optimal target SIR (Signal to Interference Ratio) is determined in accordance with an average of target quality, that is, an error rate at a relatively long period of time (about 100 microseconds to a couple of seconds), as described in "Easy IMT-2000", K. Kinoshita, 2001, published by Denki Tsushin Kyokai.

FIG. 1 is a block diagram of a section in a conventional mobile communication terminal for controlling power at which a base station transmits signals to the mobile communication terminal.

The conventional mobile communication terminal illustrated in FIG. 1 is comprised of a wireless signal transmitter/receiver 100, a de-spreader 101 which de-spreads signals having been received from a base station through the wireless signal transmitter/receiver 100, a RAKE-synthesizer 102 which RAKE-synthesizes the signals having been de-spread in the de-spreader 101, a quality detector 103 which measures quality of receives signals when a volume of received signals reaches a predetermined volume, a target quality memory 104 storing target quality therein, a quality comparator 105 which compares quality of received signals, having been measured by quality detector 103, to the target quality stored in the target quality memory 104, and produces a target SIR in accordance with the result of the comparison, a target SIR adjuster 106 which stores a target SIR transmitted from the quality comparator 105, a SIR detector 107 which measures a SIR of the received signals, a SIR comparator 108 which compares a SIR of the received signals, transmitted from the SIR detector 107, to the target SIR transmitted from the target SIR adjuster 106, and a TPC bit producer 109 which produces power-control data in accordance with the result of the comparison transmitted from the SIR comparator 108, and transmits the control data to a base station through the wireless signal transmitter/receiver 100.

The inner-loop control is accomplished as follows.

First, signals having been received from a base station through the wireless signal transmitter/receiver 100 are de-spread in the de-spreader 101. The thus de-spread signals are RAKE-synthesized in the RAKE-synthesizer 102. Then, a SIR of the received signals is measured in the SIR detector 107. The SIR comparator 108 compares a SIR of the received signal, received from the SIR detector 107, to a target SIR received from the target SIR adjuster 106. The TPC bit producer 109 produces power-control data in accordance with the result of the comparison transmitted from the SIR comparator 108, and transmits the control data to a base station through the wireless signal transmitter/receiver 100.

In the inner-loop control, when there is a difference between the target SIR and the SIR of the received signals, the mobile communication terminal transmits a request to a base station to change power at which the base station transmits signals to the mobile communication terminal. Specifically, if the SIR of the received signals is lower than the target SIR, the mobile communication terminal transmits a request to a base station to increase the power, whereas if the SIR of the received signals is higher than the target SIR, the mobile communication terminal transmits a request to a base station to reduce the power.

The outer-loop control is accomplished as follows.

The quality detector 103 measures quality of receives signals, for instance, a block error rate (BLER) when a volume of the received signals reaches a predetermined volume. Then, the quality comparator 105 compares quality of the received signals, having been measured by quality detector 103, to a target quality stored in the target quality memory 104, and produces a target SIR in accordance with the result of the comparison. The thus produced target SIR is transmitted to the target SIR adjuster 106.

In the outer-loop control, the mobile communication terminal receives target quality such as 1% of an error rate from a base station. Then, the mobile communication terminal raises a target SIR by a predetermined increment when an error rate is higher than the target quality, and reduces the target SIR by a predetermined decrement when an error rate is smaller than the target quality. The mobile communication terminal usually sets a minimum SIR such that a target SIR is not much lowered in order to avoid communication interruption caused by rapid change in communication environment.

FIG. 2 is a time chart showing how a target SIR varies in the conventional mobile communication terminal.

Hereinbelow is explained how a target SIR varies with reference to FIG. 2.

Each of P1, P2 and P3 indicates a time at which the outer-loop control is carried out. An interval among P1, P2 and P3 is expressed as T. Specifically, the quality comparator 105 compares quality of the received signals, having been measured by quality detector 103, to a target quality stored in the target quality memory 104 at every interval T.

Since the quality of the received signals is lower than the target quality (for instance, 1% of BLER) at P1 and P2, the mobile communication terminal reduces a target SIR by a predetermined decrement. The quality of the received signals reaches at a minimum SIR at P3. Thereafter, the target SIR is controlled so as not to lower beyond the minimum SIR.

Japanese Patent Application Publication No. 2003-188815 has suggested a method of controlling a target SIR to rapidly converge a target SIR to a predetermined SIR determined in relation with quality of a signal-transmission channel. In the method, after outer-loop power control starts and until BLER becomes greater than zero, a target SIR is converged into a predetermined BLER having been set in a short period of time, and after BLER became greater than zero, a target SIR is slightly varied in the vicinity of the predetermined BLER.

In the conventional outer-loop control, a target SIR is varied when a number of received blocks reaches at a predetermined number. Thus, if a volume of received data is significantly small such as packet communication, it is resulted in that a target SIR is kept high for a long period of time. That is, when BLER is calculated in the outer-loop control, it was not possible to lower a target SIR until data block sufficient for calculating target quality was received.

As a result, when a volume of received data is significantly small such as in packet communication, a base station was unnecessarily requested for a long period of time to spend power for transmitting signals. In other words, regardless of a small volume of received data, a base station was requested to spend high power for transmitting signals, resulting in increased interference with other users.

In order to solve the above-mentioned problem, the inventor suggested a mobile communication terminal and a method of controlling signal-transmission power in Japanese Patent Application No. 2004-116916, not published yet as of Sep. 1, 2005. Hereinbelow is explained the mobile communication terminal and the method of controlling signal-transmission power both suggested in Japanese Patent Application No. 2004-116916, but it should be noted that the explanation about Japanese Patent Application No. 2004-116916 is made hereinbelow only for the purpose of better understanding of the present invention. The explanation about Japanese Patent Application No. 2004-116916 does not mean that the inventor admits the Application as prior art to the present invention.

The mobile communication terminal and the method of controlling signal-transmission power make it possible to lower a target SIR by means of a counter which transmits a timing signal in accordance with which quality of received signals is measured, even when a volume of received data is small, thereby reducing power at which a base station transmits signals to the mobile station.

The suggested mobile communication terminal de-spreads signals received from a base station, RAKE-synthesizes the thus de-spread signals to measure a SIR of the received signals, compares the SIR of the received signals to a target SIR, produces power-control data in accordance with the result of the comparison, and transmits the power-control data to a base station. The mobile communication terminal includes a quality detector which measures quality of received signals when a volume of received data reaches a predetermined volume, a counter which transmits a timing signal in accordance with which quality of the received signals is measured, and a comparator which compares target quality to one of quality of the received signals having been measured by the quality detector and quality of the received signals having been measured in accordance with the timing signal, and determines a target SIR in accordance with the result of the comparison.

The mobile communication terminal having the above-mentioned structure reduces the target SIR in accordance with the timing signal transmitted from the counter, even when a volume of received data is small, ensuring that a base station is not requested to spend unnecessary power at which the base station transmits signals to the mobile station.

If communication environment of the mobile communication terminal is sufficiently good, the communication quality may be maximized in the outer-loop control, when the target SIR is lowered to a minimum target SIR. For instance, as illustrated in FIG. 2, even after the target SIR reached a minimum target SIR, BLER may become equal to 0%, in which case, since BLER is smaller than a target error rate (for instance, 1%), control for reducing power at which a base station transmits signals is not carried out. Accordingly, when communication environment of the mobile communication terminal is sufficiently good, the power at which a base station transmits signals is not reduced to a minimum, even though the power can be further reduced. As a result, the mobile communication terminal requests a base station to wastefully spend power for transmitting signals to the mobile communication terminal.

Japanese Patent Application Publication No. 2004-112097 has suggested a mobile communication terminal including a power-control module. An SIR detector measures a SIR of received signals. A SIR detector produces a TPC bit signal indicative of "up" command or "down" command in accordance with the result of the comparison of the measured SIR of received signals with a target SIR. A quality detector measures BLER. The target SIR is varied such that the measured BLER becomes close to a target BLER.

SUMMARY OF THE INVENTION

In view of the above-mentioned problems in the conventional mobile communication terminal, it is an object of the present invention to provide a mobile communication terminal and a method of controlling power at which a base station transmits signals to a mobile communication terminal, both of which make it possible to reduce power at which a base station transmits signals to a mobile communication terminal, in accordance with communication environment of the mobile communication terminal.

Hereinbelow are described a mobile communication terminal and a method of controlling power at which a base station transmits signals to a mobile communication terminal, both in accordance with the present invention, through the use of reference numerals used in later described embodiments. The reference numerals are indicated only for the purpose of clearly showing correspondence between claims and the embodiments. It should be noted that the reference numerals are not allowed to interpret claims of the present application.

In one aspect of the present invention, there is provided a mobile communication terminal (150, 200, 250) including a de-spreader (11) which de-spreads signals received from a base station, a RAKE-synthesizer (12) which RAKE-synthesizes the signals having been de-spread by the de-spreader (11), a SIR detector (17) which measures a SIR (signal to interference power ratio) of the received signals, based on the signals having been RAKE-synthesized by the RAKE-synthesizer (12), a SIR comparator (18) which compares a SIR of the received signals to a target SIR, a bit producer (19) which produces a signal in accordance with which the base station controls power at which signals are transmitted, in accordance with the comparison result transmitted from the SIR comparator (18), and transmits the signal to the base station, a quality detector (13) which measures quality of the received signals at a predetermined interval, a quality comparator (15) which compares the quality of the received signals, transmitted from the quality detector (13), with target quality, the quality comparator (15) lowering the target SIR, if the quality of the received signals is higher than the target quality, and raising the SIR, if the quality of the received signals is lower than the target quality, and a controller (20) which stores a minimum target SIR therein, and varies the minimum SIR in accordance with a relation between the target SIR and the quality of the received signals.

It is preferable that the controller (20) stores a plurality of minimum target SIRs, and varies the minimum SIR from a certain minimum target SIR gradually or directly to another minimum target SIR.

It is preferable that the controller (20), when the target SIR is equal to or lower than a first minimum target SIR and further when the quality of the received signals keeps higher than the target quality for a predetermined period of time, lowers the minimum target SIR such that the minimum target SIR does not lower beyond a second minimum target SIR smaller than the first minimum target SIR.

It is preferable that the controller (20), when the target SIR is equal to a first minimum target SIR and further when the quality comparator judges the quality of the received signals to be higher than the target quality successively by a predetermined number, lowers the minimum target SIR to a second minimum target SIR lower than the first minimum target SIR.

It is preferable that the controller (20), when the target SIR is lower than a first minimum target SIR and further when the quality of the received signals keeps lower than the target quality for a predetermined period of time, changes the minimum target SIR into the first minimum target SIR.

The mobile communication terminal (150, 200, 250) may further include a power detector (21) which detects fluctuation in power at which the mobile communication terminal receives signals, and wherein the controller (20) varies the minimum target SIR in accordance with the fluctuation received from the power detector (21).

It is preferable that the controller (20) lowers the minimum target SIR when the fluctuation is smaller than a threshold fluctuation, and raises the minimum target SIR when the fluctuation is greater than the threshold fluctuation.

The mobile communication terminal (150, 200, 250) may further include a location detector (22) which detects location of the mobile communication terminal, and wherein the controller (20) varies the minimum target SIR in accordance with the location received from the location detector (22).

It is preferable that the controller (20) lowers the minimum target SIR when fluctuation in the location is smaller than a threshold fluctuation, and raises the minimum target SIR when fluctuation in the location is greater than the threshold fluctuation.

For instance, the quality of the received signals and the target quality are expressed as a block error rate.

In another aspect of the present invention, there is provided a method of controlling power at which a base station transmits signals to a mobile communication terminal, including (a) de-spreading signals received from a base station, (b) RAKE-synthesizing the signals having been de-spread in the step (a), (c) measuring a SIR (signal to interference power ratio) of the received signals, based on the signals having been RAKE-synthesized in the step (b), (d) comparing a SIR of the received signals to a target SIR, (e) producing a signal in accordance with which the base station controls power at which signals are transmitted, in accordance with the comparison result of the step (d), and transmitting the signal to the base station, (f) measuring quality of the received signals at a predetermined interval, (g) comparing the quality of the received signals, having been measured in the step (f), with target quality, (h) lowering the target SIR, if the quality of the received signals is higher than the target quality, or raising the SIR, if the quality of the received signals is lower than the target quality, and (i) setting a minimum SIR, and varying the minimum SIR in accordance with a relation between the target SIR and the quality of the received signals.

It is preferable that, in the step (i), a plurality of minimum target SIRs is set, and the minimum SIR is varied from a certain minimum target SIR gradually or directly to another minimum target SIR.

It is preferable that when the target SIR is equal to or lower than a first minimum target SIR and further when the quality of the received signals keeps higher than the target quality for a predetermined period of time, the minimum target SIR is lowered in the step (i) such that the minimum target SIR does not lower beyond a second minimum target SIR smaller than the first minimum target SIR.

It is preferable that when the target SIR is equal to a first minimum target SIR and further when the quality comparator judges the quality of the received signals to be higher than the target quality successively by a predetermined number, the minimum target SIR is lowered to a second minimum target SIR lower than the first minimum target SIR, in the step (i)

It is preferable that when the target SIR is lower than a first minimum target SIR and further when the quality of the received signals keeps lower than the target quality for a predetermined period of time, the minimum target SIR is changed into the first minimum target SIR in the step (i).

The method may further include detecting fluctuation in power at which the mobile communication terminal receives signals, wherein the minimum target SIR is varied in accordance with the fluctuation.

It is preferable that the minimum target SIR is lowered when the fluctuation is smaller than a threshold fluctuation, and is raised when the fluctuation is greater than the threshold fluctuation.

The method may further include detecting location of the mobile communication terminal, wherein the minimum target SIR is varied in accordance with the location.

It is preferable that the minimum target SIR is lowered when fluctuation in the location is smaller than a threshold fluctuation, and is raised when fluctuation in the location is greater than the threshold fluctuation.

For instance, the quality of the received signals and the target quality are expressed as a block error rate.

The advantages obtained by the aforementioned present invention will be described hereinbelow.

In the mobile communication terminal in accordance with the present invention, a minimum target SIR is dynamically varied in accordance with communication environment of the mobile communication terminal. When communication environment of the mobile communication terminal is sufficiently good, the mobile communication terminal can reduce power at which a base station transmits signals, ensuring that the mobile communication terminal does not transmit a request to a base station to unnecessarily spend power for transmitting signals.

The present invention makes it possible to adaptively reduce power at which a base station unnecessarily spends to transmit signals to a mobile station, in accordance with communication environment of the mobile communication terminal. Thus, it is possible to reduce interference with other terminals, and increase a capacity of a communication system such as a number of base station to be included in the system.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 3:
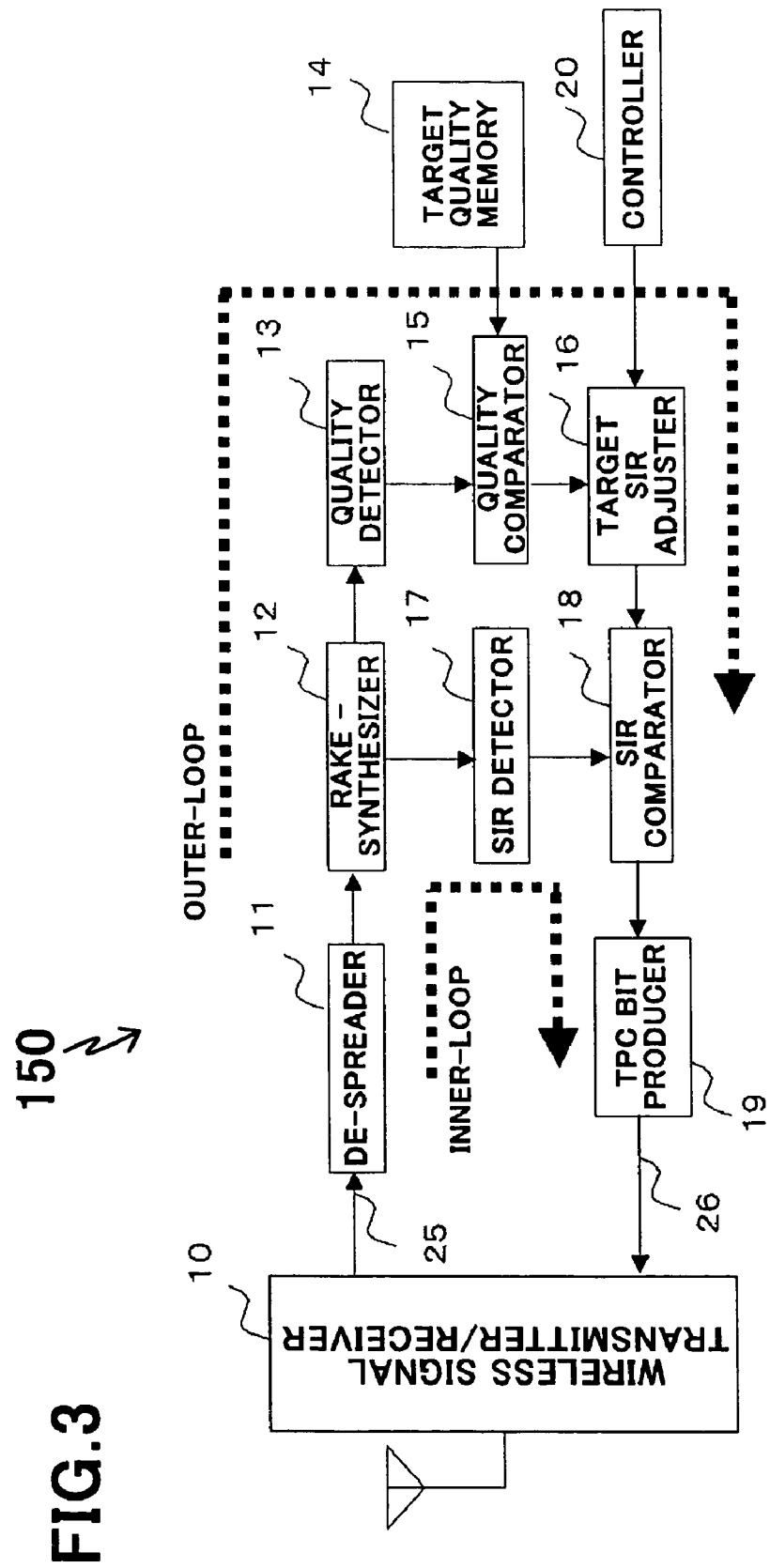
FIG. 3 is a block diagram of a mobile communication terminal in accordance with the first embodiment of the present invention.

FIG. 3 is a block diagram of a section for controlling power at which a base station transmits signals to a mobile communication terminal, in a mobile communication terminal 150 in accordance with the first embodiment of the present invention.

The mobile communication terminal 150 is comprised of a wireless signal transmitter/receiver 10, a de-spreader 11 which de-spreads signals having been received from a base station through the wireless signal transmitter/receiver 10, a RAKE-synthesizer 12 which RAKE-synthesizes the signals having been de-spread in the de-spreader 11, a quality detector 13 which measures quality of receives signals when a volume of received signals reaches a predetermined volume, a target quality memory 14 storing target quality therein, a quality comparator 15 which compares quality of received signals, having been measured by quality detector 13, to the target quality stored in the target quality memory 14, and produces a target SIR in accordance with the result of the comparison, a target SIR adjuster 16 which stores a target SIR transmitted from the quality comparator 15, a SIR detector 17 which measures a SIR of the received signals, a SIR comparator 18 which compares a SIR of the received signals, transmitted from the SIR detector 17, to the target SIR transmitted from the target SIR adjuster 16, a TPC bit producer 19 which produces power-control data in accordance with the result of the comparison transmitted from the SIR comparator 18, and transmits the control data to a base station through the wireless signal transmitter/receiver 10, and a controller 20.

Figure 1:
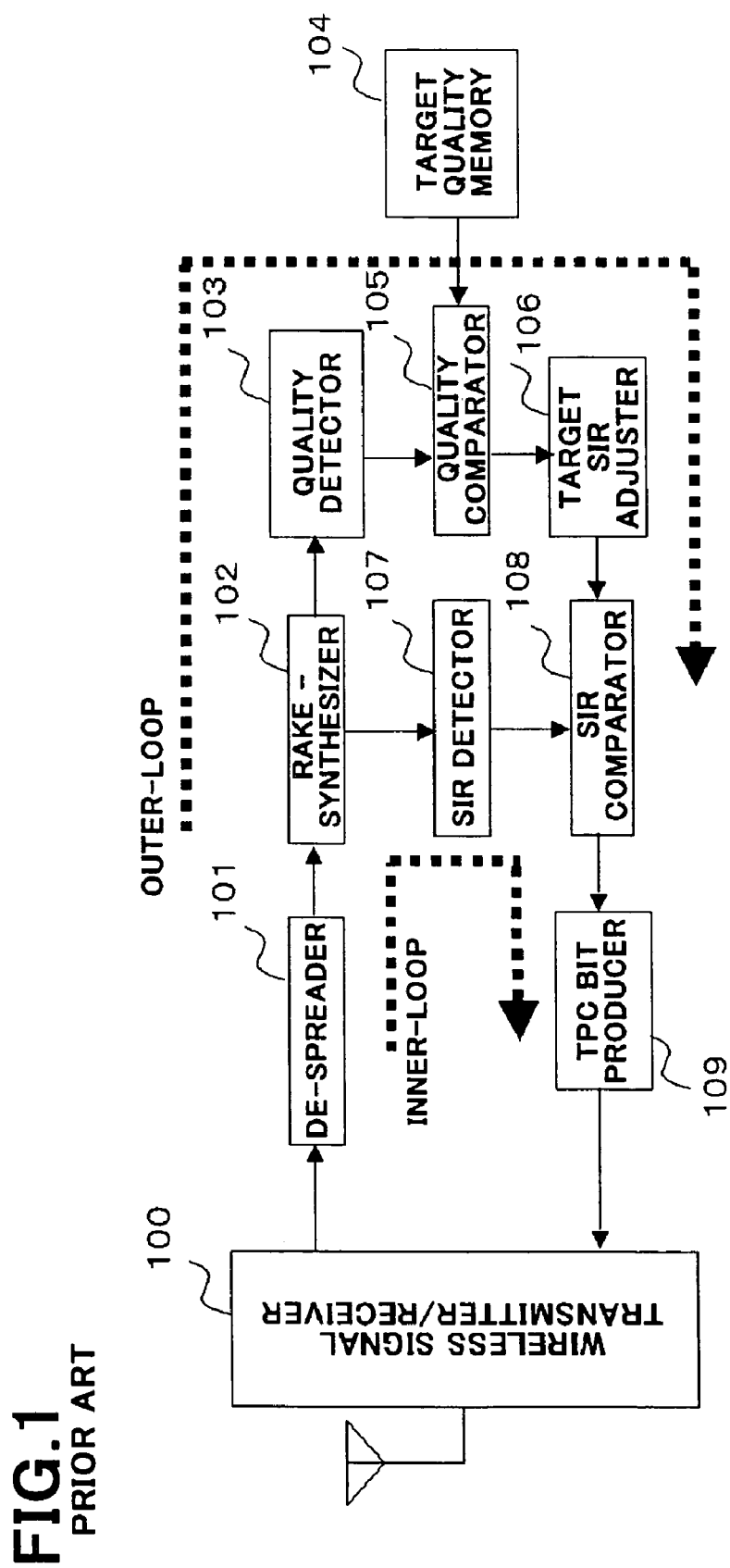
FIG. 1 is a block diagram of a conventional mobile communication terminal.
Figure 2:
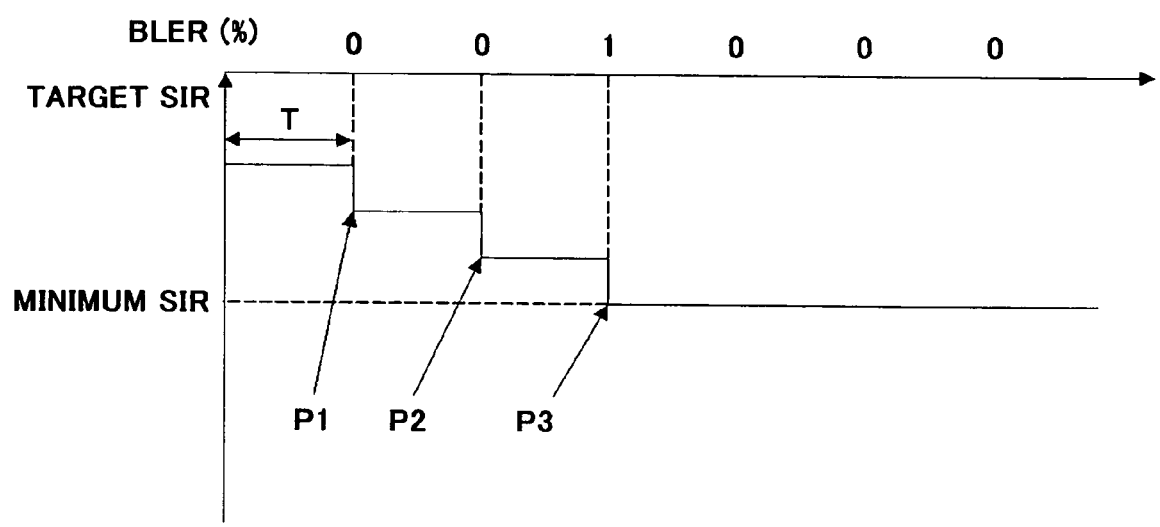
FIG. 2 is a time chart showing how a target SIR varies in the conventional mobile communication terminal illustrated in FIG. 1.

In comparison with the conventional mobile communication terminal illustrated in FIG. 1, the mobile communication terminal 150 additionally includes the controller 20.

The wireless signal transmitter/receiver 10 receives wireless signals transmitted from a base station, through an antenna, and demodulates the received signals to thereby output base-band signals 25. The wireless signal transmitter/receiver 10 further maps TPC (Transmission Power Control) bit signals 26 transmitted from the TPC bit producer 19, onto a control channel, modulates the TPC bit signals together with other data, and transmits them to a base station as wireless signals.

The de-spreader 11 de-spreads the base-band signals 25 with spread-coding series, and outputs the thus de-spread signals to the RAKE-synthesizer 12.

The RAKE-synthesizer 12 receives signals having multi-paths having delay times different from one another, from the de-spreader 11, and temporally synthesizes the receives signals to demodulate the signals, thereby obtaining data of the received signals. The thus obtained data is transmitted to both the quality detector 13 and the SIR detector 17 from the RAKE-synthesizer 12.

The quality detector 13 measures communication quality of the data received from the RAKE-synthesizer 12. Specifically, the quality detector 13 calculates BLER in accordance with CRC (Cyclic Redundancy Check) of the data calculated in the RAKE-synthesizer 12. The quality detector 13 transmits the thus calculated BLER to the quality comparator 15. When a number of blocks in the received data reaches a predetermined number, the quality detector 13 so informs the quality comparator 15.

The target quality memory 14 stores target communication quality, that is, a target BLER therein.

The quality comparator 15 compares the measured quality of the received signals to the target communication quality at a predetermined interval. Specifically, the quality comparator 15 compares BLER transmitted from the quality detector 13 with BLER stored in the target quality memory 14. The quality comparator 15 transmits the result of the comparison to the target SIR adjuster 16.

Herein, a predetermined interval indicates hundreds of microseconds to a couple of seconds, for instance. Such an interval is measured by detecting that a number of received blocks reaches a predetermined number in the quality detector 13. As an alternative, such an interval may be measured by means of timing signals transmitted from a timer counter, for instance.

The target SIR adjuster 16 varies the target SIR in accordance with the comparison results received from the quality comparator 15, and stores the thus varied target SIR therein. For instance, the target SIR adjuster 16 lowers a target SIR when the measured quality of the received signal is higher than the target communication quality, and raises a target SIR when the measured quality of the received signal is lower than the target communication quality. The target SIR adjuster 16 further stores a minimum target SIR therein, and varies a target SIR such that a target SIR is smaller than the minimum target SIR.

The controller 20 varies a minimum target SIR stored in the target SIR adjuster, in accordance with how the quality of the received signals varies and the target SIR. For instance, the controller 20 usually keeps a first minimum target SIR as a minimum target SIR. If the quality of the received signals keeps equal to the first minimum target SIR successively for a relatively long period of time (for instance, about a minute), the controller 20 varies a minimum target SIR to a second minimum target SIR smaller than the first minimum target SIR, from the first minimum target SIR. The controller 20 may gradually vary a minimum target SIR to the second minimum target SIR.

After the controller 20 varied a minimum target SIR to the second minimum target SIR, or while the controller 20 is varying a minimum target SIR to the second minimum target SIR, if the quality of the received signals becomes smaller than the target quality in a certain period of time, the controller 20 varies a minimum target SIR again to the first minimum target SIR from the second minimum target SIR.

The SIR detector 17 measures a SIR of the received signals in accordance with the data of the received signals, transmitted from the RAKE-synthesizer 12. The SIR detector 17 transmits the measured SIR to the SIR comparator 18.

The SIR comparator 18 compares the SIR of the received signals, transmitted from the SIR detector 17, to the target SIR transmitted from the target SIR adjuster 16. The SIR comparator 18 transmits the results of the comparison to the TPC bit producer 19.

The TPC bit producer 19 produces a TPC bit signal 26 in accordance with the result of the comparison transmitted from the SIR comparator 18. Specifically, the TPC bit producer 19 transmits a TPC bit signal 26 to a base station, requesting the base station to lower power at which the base station transmits signals to the mobile communication terminal, if the SIR of the received signals is higher than the target SIR, or requesting the base station to raise the power, if the SIR of the received signals is smaller than the target SIR.

The TPC bit signal 26 is transmitted to the base station through the wireless signal transmitter/receiver 10. On receipt of the TPC bit signal 26, the base station raises or reduces power for transmitting signals to the mobile communication terminal, in accordance with the TPC bit signal 26.

The control to power at which a base station transmits signals to the mobile communication terminal in the mobile communication terminal having the above-mentioned structure is comprised of outer-loop control and inner-loop control.

With respect to FIG. 3, in the outer-loop control, quality of the received signals is measured at a predetermined interval, and the thus measured quality is compared to the target quality. If the quality of the received signals is higher than the target quality, the target SIR adjuster 106 reduces a target SIR, and if the quality of the received signals is lower than the target quality, the target SIR adjuster 106 raises a target SIR. The target SIR adjuster 106 stores a minimum target SIR therein, and varies the minimum target SIR in accordance with the target SIR and how the quality of the received signals varies. Hereinbelow is explained in detail an operation of the target SIR adjuster 106.

Figure 4:
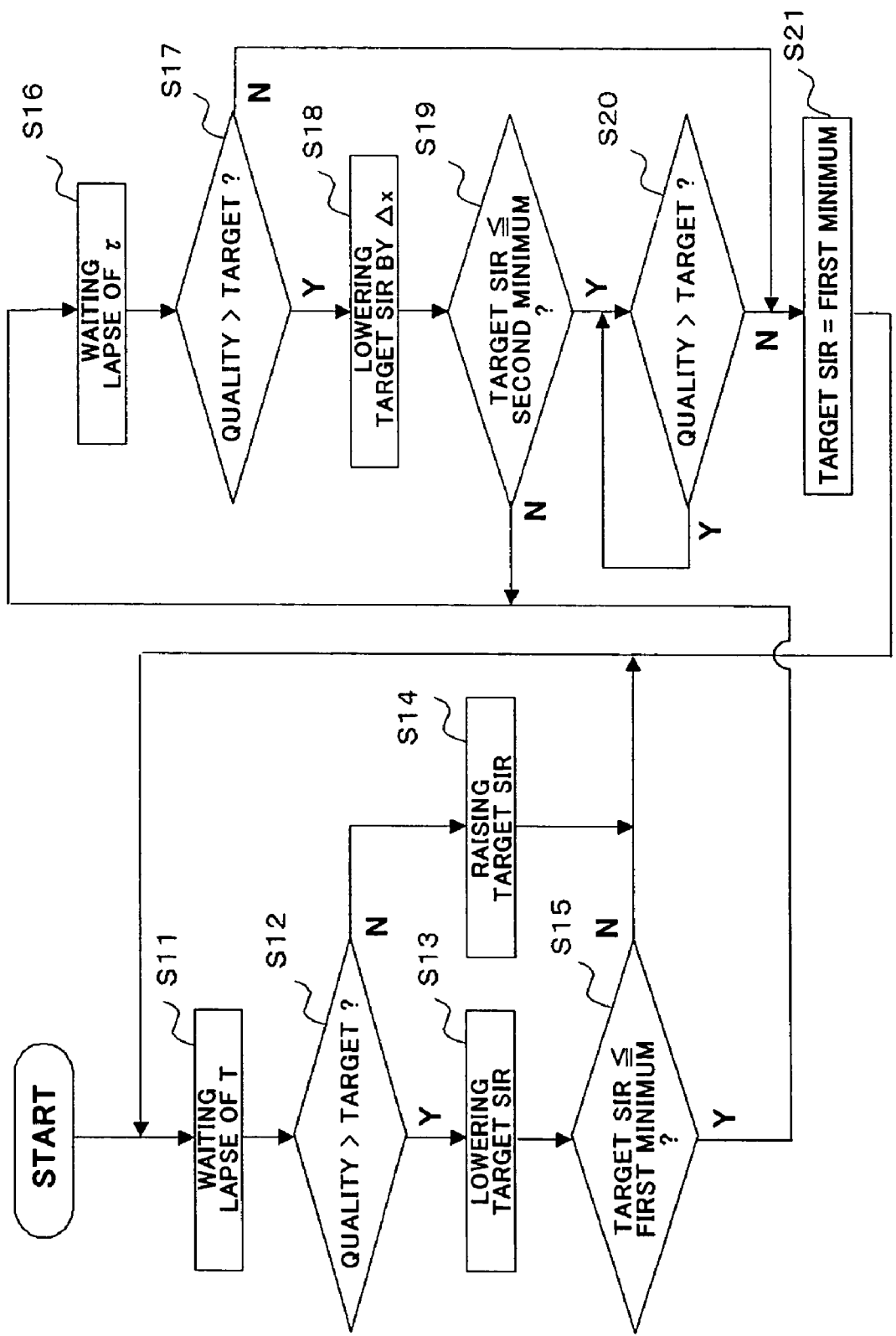
FIG. 4 is a flow chart showing steps to be carried out in the outer-loop control in the mobile communication terminal in accordance with the first embodiment of the present invention, illustrated in FIG. 3.

FIG. 4 is a flow chart showing steps to be carried out in the outer-loop control in the mobile communication terminal in accordance with the first embodiment of the present invention.

First, it is checked whether a predetermined period of time T has lapsed in step S11. The quality of the received signals is compared to the target quality at every T.

If the time T has lapsed, it is judged in the quality comparator 15 whether the quality of the received signals is higher than the target quality in step S12.

If the quality of the received signals is higher than the target quality (YES in step S12), the quality comparator 15 lowers a target SIR in step S13.

If the quality of the received signals is not higher than the target quality (NO in step S12), the quality comparator 15 raises a target SIR in step S14, and then, the step S11 is carried out again.

It is judged in step S15 whether a target SIR is equal to or smaller than a first minimum target SIR.

If the target SIR is higher than the first minimum target SIR (NO in step S15), the step S11 is carried out again.

If the target SIR is equal to or smaller than the first minimum target SIR (YES in step S15), the quality comparator 15 stands by in step S16 until a predetermined period of time τ has lapsed.

It is judged in the quality comparator 15 in step S17 whether the quality of the received signals is higher than the target quality.

If the quality of the received signals is not higher than the target quality (NO in step S17), the step S21 is carried out.

If the quality of the received signals is higher than the target quality (YES in step S17), the quality comparator 15 lowers a minimum target SIR by Δx in step S18.

Then, it is judged in the quality comparator 15 in step S19 whether the target SIR is equal to or smaller than a second minimum target SIR.

If the target SIR is higher than the second minimum target SIR (NO in step S19), the step S16 is carried out again.

If the target SIR is equal to or smaller than the second minimum target SIR (YES in step S19), it is judged in the quality comparator 15 in step S20 whether the quality of the received signals is higher than the target quality in step S20.

If the quality of the received signals is higher than the target quality (YES in step S20), the target SIR adjuster 16 keeps the target SIR unchanged.

If the quality of the received signals is not higher than the target quality (NO in step S20), the quality comparator 15 varies the target SIR to the first minimum target SIR from the second minimum target SIR in step S21, and then, the step S11 is carried out again.

The target SIR is determined in accordance with the above-mentioned outer-loop power control.

In the inner-loop power control, if there is a difference between the actually measured SIR and the target SIR having determined in the outer-loop power control, the mobile communication terminal requests a base station to raise power at which the base station transmits signals to the mobile communication terminal, when the actually measured SIR is lower than the target SIR, or to reduce the power, when the actually measured SIR is higher than the target SIR.

In the mobile communication terminal in accordance with the first embodiment of the present invention, the outer-loop power control and the inner-loop power control are simultaneously carried out to thereby accomplish the target quality, and control power at which a base station transmits signals to the mobile communication terminal, to be as small as possible.

Figure 5:
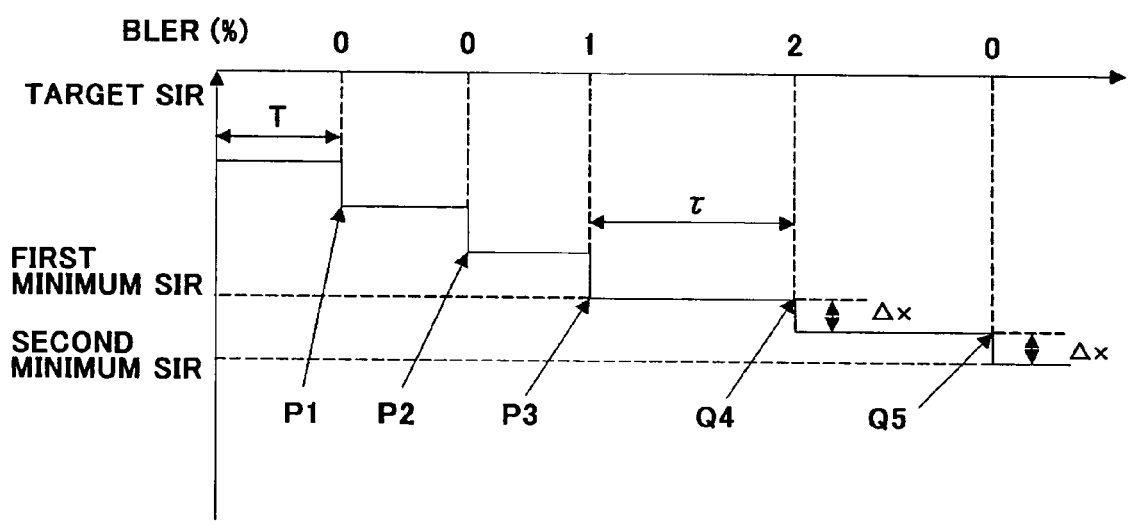
FIG. 5 is a time chart showing how a target SIR varies in the mobile communication terminal in accordance with the first embodiment of the present invention, illustrated in FIG. 3.

FIG. 5 is a time chart showing how a target SIR varies in the mobile communication terminal in accordance with the first embodiment of the present invention.

An example of the power control to be carried out by the mobile communication terminal is explained hereinbelow with reference to FIG. 5.

In FIG. 5, it is assumed that BLER as the target quality is 5%.

First, an initial target SIR is determined. The quality comparator 15 compares the quality of the received signals with the target quality at an interval T.

It is assumed that BLER is 0% at P1. Thus, since the quality of the received signals is higher than the target quality, the quality comparator 15 lowers the target SIR at P1.

The quality comparator 15 further lowers the target SIR also at P2.

The quality comparator 15 further lowers the target SIR also at P3.

Since the target SIR reaches at a first minimum target SIR at P3, the quality comparator 15 hereinafter compares the quality of the received signals with the target quality at an interval τ (for instance, about one minute).

Since the quality of the received signals remains higher than the target quality at Q4, the quality comparator 15 lowers the target SIR by Δx.

Since the quality of the received signals remains higher than the target quality at Q5, the quality comparator 15 further lowers the target SIR by Δx. As a result, the target SIR reaches at a second minimum target SIR. Thus, the quality comparator 15 hereinafter remains the target SIR to be equal to the second minimum target SIR as long as the quality of the received signals is higher than the target quality.

In the mobile communication terminal in accordance with the first embodiment, even in a case in which the quality of the received signals is in maximum even if the target SIR is lowered to the first minimum target SIR, the target SIR is lowered to the second minimum target SIR smaller than the first minimum target SIR. Thus, when communication environment of the mobile communication terminal is sufficiently good, it would be possible for a base station to reduce power for transmitting signals to the mobile communication terminal, ensuring much reduction in interference with the other mobile communication terminals. As a result, it is possible to increase a number of mobile communication terminals covered by the base station.

Second Embodiment

Figure 6:
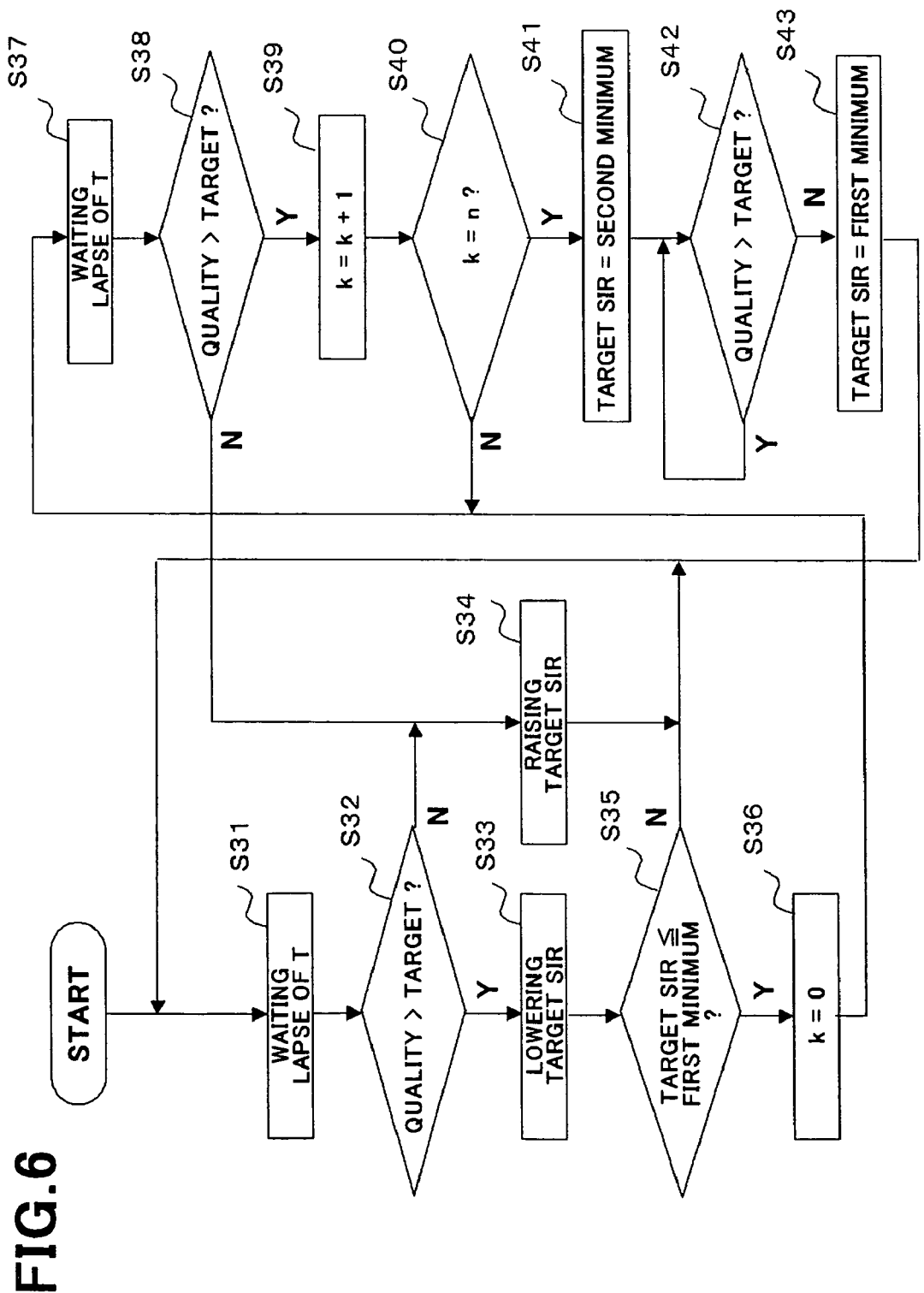
FIG. 6 is a flow chart showing steps to be carried out in the outer-loop control in the mobile communication terminal in accordance with the second embodiment of the present invention.

FIG. 6 is a flow chart showing steps to be carried out in the outer-loop control in the mobile communication terminal in accordance with the second embodiment of the present invention.

The outer-loop control in the mobile communication terminal in accordance with the second embodiment is different from the outer-loop control in the mobile communication terminal in accordance with the first embodiment only in a process of reducing a target SIR to a second minimum target SIR from a first minimum target SIR.

The mobile communication terminal in accordance with the second embodiment has the same structure as that of the mobile communication terminal in accordance with the first embodiment. In FIG. 6, steps S31 to S35 are identical with steps S11 to S15 in FIG. 4, and hence, will not be explained.

In step S36, an integer "k" indicating a number of a predetermined period of times T is reset into zero (0). As mentioned earlier, the quality of the received signals is compared to the target quality at every T.

Then, the quality comparator 15 stands by in step S37 until a predetermined period of time T has lapsed.

It is judged in the quality comparator 15 in step S38 whether the quality of the received signals is higher than the target quality.

If the quality of the received signals is not higher than the target quality (NO in step S38), the step S34 is carried out again.

If the quality of the received signals is higher than the target quality (YES in step S38), the integer "k" is replaced with "k+1". Thereafter, the integer "k+1" is treated as "k".

Then, it is judged in step S40 whether the integer "k" reaches at an integer "n".

If the integer "k" does not reach at an integer "n" (NO in step S40), the step S37 is carried out again.

If the integer "k" reaches at an integer "n" (YES in step S40), the quality comparator 15 sets a target SIR to be equal to a second minimum target SIR in step S41.

Then, it is judged in the quality comparator 15 in step S42 whether the quality of the received signals is higher than the target quality.

If the quality of the received signals is higher than the target quality (YES in step S42), the quality comparator 15 remains the target SIR equal to the second minimum target SIR.

If the quality of the received signals is not higher than the target quality (NO in step S42), the quality comparator 15 returns the target SIR to the first minimum target SIR from the second minimum target SIR. Then, step S31 is carried out again.

A target SIR is determined in accordance with the above-mentioned outer-loop power control. The inner-loop power control in the second embodiment is carried out in the same as the first embodiment.

Figure 7:
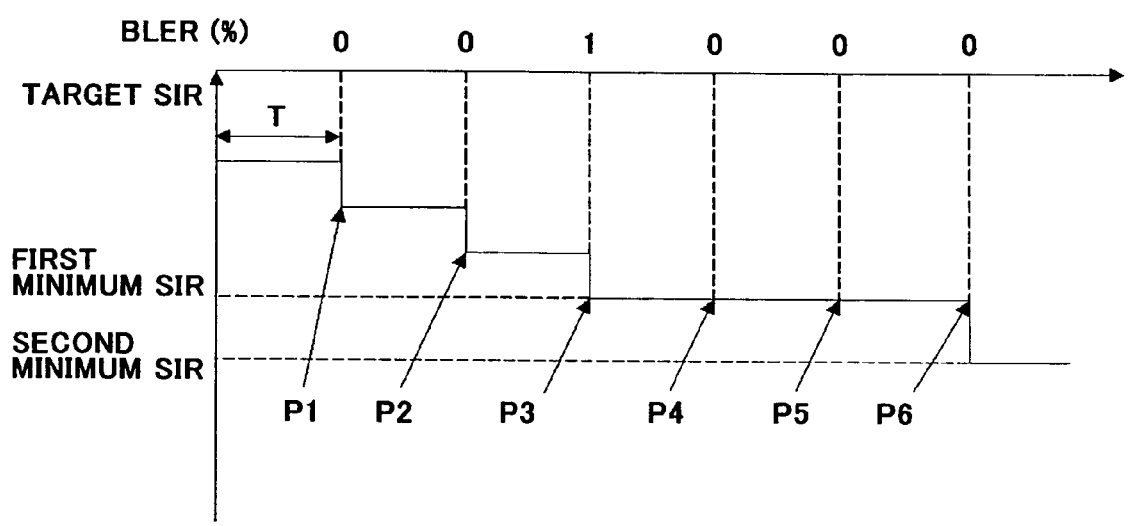
FIG. 7 is a time chart showing how a target SIR varies in the mobile communication terminal in accordance with the second embodiment of the present invention.

FIG. 7 is a time chart showing how a target SIR varies in the mobile communication terminal in accordance with the second embodiment of the present invention.

An example of the power control to be carried out by the mobile communication terminal in accordance with the second embodiment is explained hereinbelow with reference to FIG. 7.

In FIG. 7, it is assumed that BLER as the target quality is 5%.

First, an initial target SIR is determined. The quality comparator 15 compares the quality of the received signals with the target quality at an interval T.

It is assumed that BLER is 0% at P1. Thus, since the quality of the received signals is higher than the target quality, the quality comparator 15 lowers the target SIR at P1.

The quality comparator 15 further lowers the target SIR also at P2.

The quality comparator 15 further lowers the target SIR also at P3.

Since the target SIR reaches at a first minimum target SIR at P3, the quality comparator 15 sets the target SIR equal to a second minimum target SIR smaller than the first minimum target SIR, if the quality of the received signals is higher than the target quality successively "n" times ("n" is equal to three (3) in FIG. 7, that is, P4, P5 and P6) at the interval T. The quality comparator 15 hereinafter remains the target SIR to be equal to the second minimum target SIR as long as the quality of the received signals is higher than the target quality.

In the mobile communication terminal in accordance with the second embodiment, even in a case in which the quality of the received signals is higher than the target SIR even if the target SIR is lowered to the first minimum target SIR, the target SIR is lowered to the second minimum target SIR smaller than the first minimum target SIR. Thus, when communication environment of the mobile communication terminal is sufficiently good, it would be possible for a base station to reduce power for transmitting signals to the mobile communication terminal, ensuring much reduction in interference with the other mobile communication terminals. As a result, it is possible to increase a number of mobile communication terminals covered by the base station.

Third Embodiment

Figure 8:
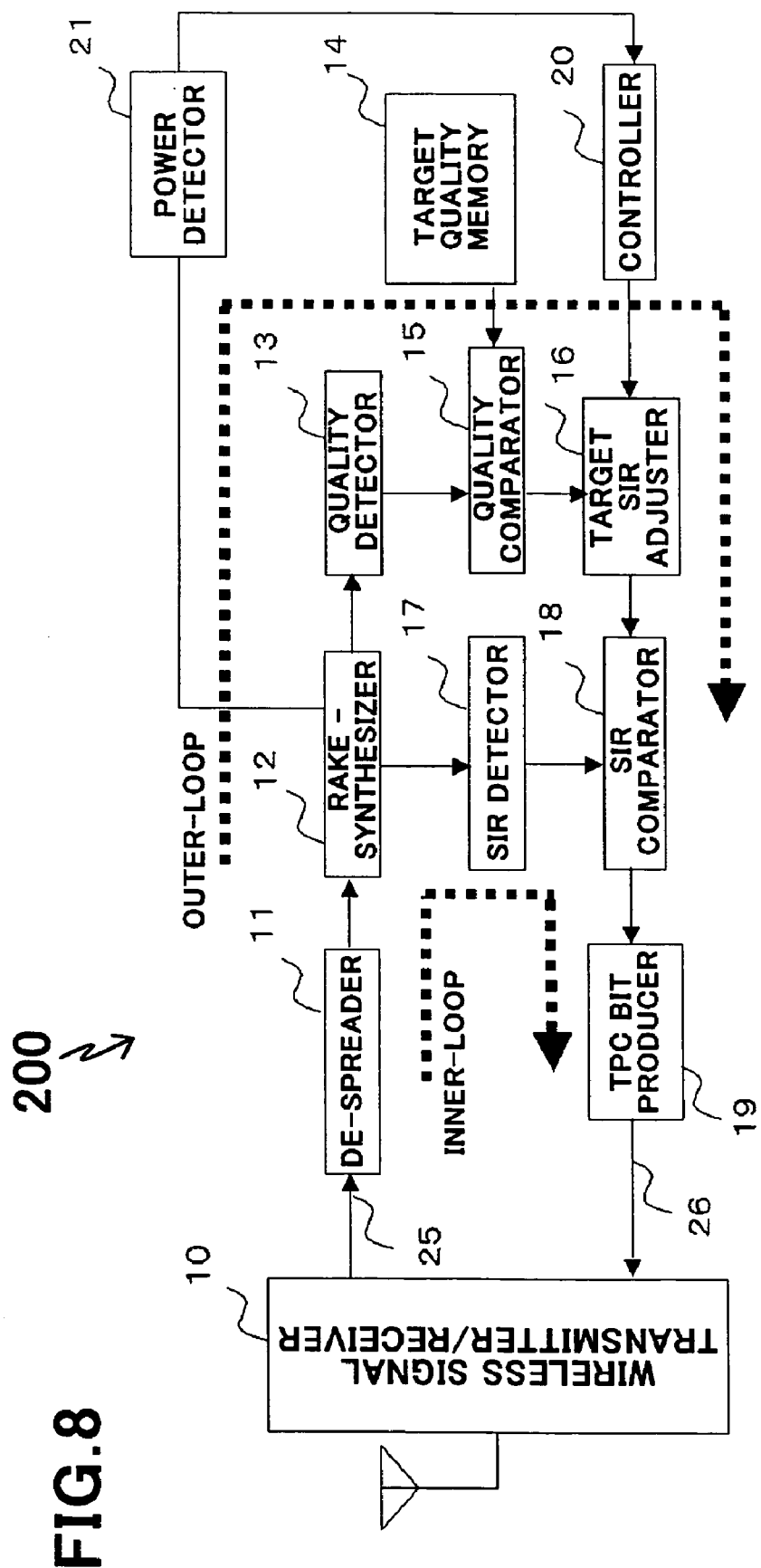
FIG. 8 is a block diagram of a mobile communication terminal in accordance with the third embodiment of the present invention.

FIG. 8 is a block diagram of a section for controlling power at which a base station transmits signals to a mobile communication terminal, in a mobile communication terminal 200 in accordance with the third embodiment of the present invention.

The mobile communication terminal 200 in accordance with the third embodiment additionally includes a power detector 21 in comparison with the mobile communication terminal 150 in accordance with the first embodiment, illustrated in FIG. 3. Parts or elements that correspond to those of the mobile communication terminal 150 in accordance with the first embodiment have been provided with the same reference numerals, and operate in the same manner as corresponding parts or elements in the first embodiment, unless explicitly explained hereinbelow.

The power detector 21 detects fluctuation in the power at which he mobile communication terminal receives signals from a base station, in the RAKE-synthesizer 12, and transmits the result of the detection to the controller 20.

The controller 20 operates in the same way as that of the controller 20 in the first embodiment, and controls varying a minimum target SIR in accordance with the fluctuation in the power, transmitted from the power detector 12, as well as in accordance with the factors as set forth in the first embodiment.

If the fluctuation in the power is smaller than a threshold, the controller 20 lowers a minimum target SIR, and if the fluctuation in the power is higher than a threshold, the controller 20 raises a minimum target SIR.

For instance, when a minimum target SIR is equal to a first minimum target SIR and further when the fluctuation in the power remains small for a predetermined period of time, the controller 20 lowers a minimum target SIR to a second minimum target SIR smaller than the first minimum target SIR. The controller 20 may gradually lower a minimum target SIR to a second minimum target SIR smaller than the first minimum target SIR.

After the controller 20 varied a minimum target SIR to the second minimum target SIR, or while the controller 20 is varying a minimum target SIR to the second minimum target SIR, if the fluctuation in the power becomes higher than the threshold, the controller 20 may vary a minimum target SIR again to the first minimum target SIR from the second minimum target SIR.

As an alternative, the controller 20 may raise or lower a minimum target SIR partially in accordance with the fluctuation in the power. For instance, if the quality of the received signals is higher than the target quality, the controller 20 lowers the minimum target SIR, and if the fluctuation in the power is higher than the threshold, the controller 20 raises the minimum target SIR.

In the mobile communication terminal 200 in accordance with the third embodiment, a minimum target SIR is varied in accordance with the fluctuation in the power at which the mobile communication terminal 200 receives signals from a base station, as well as in accordance with the result of the comparison of the quality of the received signals with the target quality. Thus, it is possible to control a minimum target SIR by detecting fluctuation in the quality of the received signals.

When a minimum target SIR is to be varied in accordance with the result of the comparison of the quality of the received signals with the target quality, it would take much time to vary a minimum target SIR, because the quality of the received signals has to be measured successively for a long period of time.

In contrast, it is possible to detect the fluctuation in the power at which the mobile communication terminal receives signals from a base station, in a short period of time.

If the fluctuation in the power is small, it is considered that the quality of the received signals keeps higher than the target quality, and if the fluctuation in the power is large, it is considered that the quality of the received signals becomes lower than the target quality. That is, the fluctuation in the quality of the received signals can be detected by detecting the fluctuation in the power at which the mobile communication terminal 200 receives signals from a base station.

Fourth Embodiment

Figure 9:
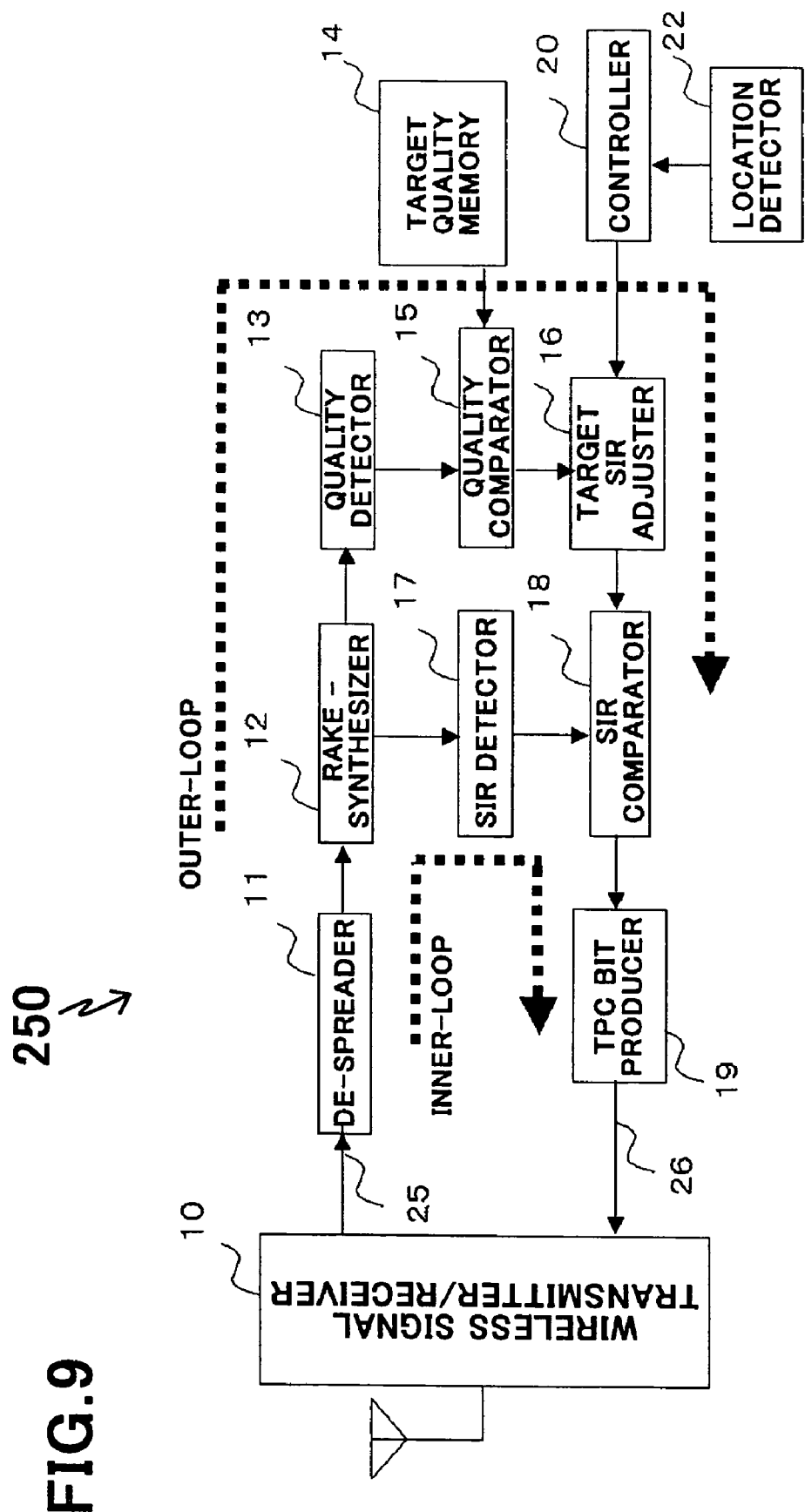
FIG. 9 is a block diagram of a mobile communication terminal in accordance with the fourth embodiment of the present invention.

FIG. 9 is a block diagram of a section for controlling power at which a base station transmits signals to a mobile communication terminal, in a mobile communication terminal 250 in accordance with the fourth embodiment of the present invention.

The mobile communication terminal 250 in accordance with the fourth embodiment additionally includes a location detector 22 in comparison with the mobile communication terminal 150 in accordance with the first embodiment, illustrated in FIG. 3. Parts or elements that correspond to those of the mobile communication terminal 150 in accordance with the first embodiment have been provided with the same reference numerals, and operate in the same manner as corresponding parts or elements in the first embodiment, unless explicitly explained hereinbelow.

The location detector 22 includes a device for detecting a location of the mobile communication terminal 250, such as a global positioning system (GPS). The location detector 22 detects a location of the mobile communication terminal 250, and transmits the result of the detection to the controller 20.

The controller 20 operates in the same way as that of the controller 20 in the first embodiment, and controls varying a minimum target SIR in accordance with the fluctuation in a location of the mobile communication terminal 250, transmitted from the location detector 22, as well as in accordance with the factors as set forth in the first embodiment.

If the fluctuation in a location of the mobile communication terminal 250 is smaller than a threshold, the controller 20 lowers a minimum target SIR, and if the fluctuation in a location of the mobile communication terminal 250 is higher than a threshold, the controller 20 raises a minimum target SIR.

For instance, when a minimum target SIR is equal to a first minimum target SIR and further when the fluctuation in a location of the mobile communication terminal 250 remains small for a predetermined period of time, the controller 20 lowers a minimum target SIR to a second minimum target SIR smaller than the first minimum target SIR. The controller 20 may gradually lower a minimum target SIR to a second minimum target SIR smaller than the first minimum target SIR.

After the controller 20 varied a minimum target SIR to the second minimum target SIR, or while the controller 20 is varying a minimum target SIR to the second minimum target SIR, if the fluctuation in a location of the mobile communication terminal 250 becomes higher than the threshold, the controller 20 may vary a minimum target SIR again to the first minimum target SIR from the second minimum target SIR.

As an alternative, the controller 20 may raise or lower a minimum target SIR partially in accordance with the fluctuation in a location of the mobile communication terminal 250. For instance, if the quality of the received signals is higher than the target quality, the controller 20 lowers the minimum target SIR, and if the fluctuation in a location of the mobile communication terminal 250 is higher than the threshold, the controller 20 raises the minimum target SIR.

In the mobile communication terminal 250 in accordance with the fourth embodiment, a minimum target SIR is varied in accordance with the fluctuation in a location of the mobile communication terminal 250, as well as in accordance with the result of the comparison of the quality of the received signals with the target quality. Thus, it is possible to control a minimum target SIR by detecting fluctuation in the quality of the received signals.

When a minimum target SIR is to be varied in accordance with the result of the comparison of the quality of the received signals with the target quality, it would take much time to vary a minimum target SIR, because the quality of the received signals has to be measured successively for a long period of time.

In contrast, it is possible to detect the fluctuation in a location of the mobile communication terminal 250, in a short period of time.

If the fluctuation in a location of the mobile communication terminal 250 is small, it is considered that the quality of the received signals keeps higher than the target quality, and if the fluctuation in a location of the mobile communication terminal 250 is large, it is considered that the quality of the received signals becomes lower than the target quality due to fading. That is, the fluctuation in the quality of the received signals can be detected by detecting the fluctuation in a location of the mobile communication terminal 250.

In the above-mentioned first to fourth embodiments, a minimum target SIR is raised or lowered between a first minimum target SIR and a second minimum target SIR. It should be noted that there may be used a third minimum target SIR smaller than the second minimum target SIR. For instance, when a minimum target SIR is equal to the second minimum target SIR and further when the quality of the receives signals keeps higher than the target SIR for a predetermined period of time, the controller 20 may lower a minimum target SIR to the third minimum target SIR from the second minimum target SIR.

That is, the above-mentioned relation between the first minimum target SIR and the second minimum target SIR may be applied to a relation between the second minimum target SIR and the third minimum target SIR in the above-mentioned first to fourth embodiments.

Furthermore, there may be used a k-th minimum target SIR wherein k indicates a positive integer, in which case, the above-mentioned relation between the first minimum target SIR and the second minimum target SIR may be applied to a relation between the k-th minimum target SIR and the (k+1)-th minimum target SIR.

The present invention may be applied to an apparatus or a system for controlling power at which a base station transmits signals thereto, in a mobile communication terminal such as a mobile communication phone, a personal handy phone system (PHS), and a personal data assistant (PDA).

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2004-268372 filed on Sep. 15, 2004 including specification, claims, drawings and summary is incorporated herein by reference in its entirety.

What is claimed is:

1. A mobile communication terminal comprising:
   a de-spreader which de-spreads signals received from a base station;
   a RAKE-synthesizer which RAKE-synthesizes the signals having been de-spread by said de-spreader;
   a SIR detector which measures a SIR (signal to interference power ratio) of the received signals, based on the signals having been RAKE-synthesized by said RAKE-synthesizer;
   a SIR comparator which compares a SIR of the received signals to a target SIR;
   a bit producer which produces a signal in accordance with which said base station controls power at which signals are transmitted, in accordance with the comparison result transmitted from said SIR comparator, and transmits said signal to said base station;
   a quality detector which measures quality of the received signals at a predetermined interval;
   a quality comparator which compares the quality of the received signals, transmitted from said quality detector, with target quality,
   said quality comparator lowering said target SIR, if said quality of the received signals is higher than said target quality, and raising said SIR, if said quality of the received signals is lower than said target quality; and
   a controller which stores a minimum target SIR therein, and varies said minimum SIR in accordance with a relation between said target SIR and said quality of the received signals.

2. The mobile communication terminal as set forth in claim 1, wherein said controller stores a plurality of minimum target SIRs, and varies said minimum SIR from a certain minimum target SIR gradually or directly to another minimum target SIR.

3. The mobile communication terminal as set forth in claim 1, wherein said controller, when said target SIR is equal to or lower than a first minimum target SIR and further when said quality of the received signals keeps higher than said target quality for a predetermined period of time, lowers said minimum target SIR such that said minimum target SIR does not lower beyond a second minimum target SIR smaller than said first minimum target SIR.

4. The mobile communication terminal as set forth in claim 1, wherein said controller, when said target SIR is equal to a first minimum target SIR and further when said quality comparator judges said quality of the received signals to be higher than said target quality successively by a predetermined number, lowers said minimum target SIR to a second minimum target SIR lower than said first minimum target SIR.

5. The mobile communication terminal as set forth in claim 1, wherein said controller, when said target SIR is lower than a first minimum target SIR and further when said quality of the received signals keeps lower than said target quality for a predetermined period of time, changes said minimum target SIR into said first minimum target SIR.

6. The mobile communication terminal as set forth in claim 1, further comprising a power detector which detects fluctuation in power at which said mobile communication terminal receives signals, and wherein said controller varies said minimum target SIR in accordance with said fluctuation received from said power detector.

7. The mobile communication terminal as set forth in claim 6, wherein said controller lowers said minimum target SIR when said fluctuation is smaller than a threshold fluctuation, and raises said minimum target SIR when said fluctuation is greater than said threshold fluctuation.

8. The mobile communication terminal as set forth in claim 1, further comprising a location detector which detects location of said mobile communication terminal, and wherein said controller varies said minimum target SIR in accordance with said location received from said location detector.

9. The mobile communication terminal as set forth in claim 8, wherein said controller lowers said minimum target SIR when fluctuation in said location is smaller than a threshold fluctuation, and raises said minimum target SIR when fluctuation in said location is greater than said threshold fluctuation.

10. The mobile communication terminal as set forth in claim 1, wherein said quality of the received signals and said target quality are expressed as a block error rate.

11. A method of controlling power at which a base station transmits signals to a mobile communication terminal, comprising:
    (a) de-spreading signals received from a base station;
    (b) RAKE-synthesizing the signals having been de-spread in said step (a);
    (c) measuring a SIR (signal to interference power ratio) of the received signals, based on the signals having been RAKE-synthesized in said step (b);
    (d) comparing a SIR of the received signals to a target SIR;
    (e) producing a signal in accordance with which said base station controls power at which signals are transmitted, in accordance with the comparison result of said step (d), and transmitting said signal to said base station;
    (f) measuring quality of the received signals at a predetermined interval;
    (g) comparing the quality of the received signals, having been measured in said step (f), with target quality,
    (h) lowering said target SIR, if said quality of the received signals is higher than said target quality, or raising said SIR, if said quality of the received signals is lower than said target quality; and
    (i) setting a minimum SIR, and varying said minimum SIR in accordance with a relation between said target SIR and said quality of the received signals.

12. The method as set forth in claim 11, wherein, in said step (i), a plurality of minimum target SIRs is set, and said minimum SIR is varied from a certain minimum target SIR gradually or directly to another minimum target SIR.

13. The method as set forth in claim 11, wherein when said target SIR is equal to or lower than a first minimum target SIR and further when said quality of the received signals keeps higher than said target quality for a predetermined period of time, said minimum target SIR is lowered in said step (i) such that said minimum target SIR does not lower beyond a second minimum target SIR smaller than said first minimum target SIR.

14. The method as set forth in claim 11, wherein when said target SIR is equal to a first minimum target SIR and further when said quality comparator judges said quality of the received signals to be higher than said target quality successively by a predetermined number, said minimum target SIR is lowered to a second minimum target SIR lower than said first minimum target SIR, in said step (i).

15. The method as set forth in claim 11, wherein when said target SIR is lower than a first minimum target SIR and further when said quality of the received signals keeps lower than said target quality for a predetermined period of time, said minimum target SIR is changed into said first minimum target SIR in said step (i).

16. The method as set forth in claim 11, further comprising detecting fluctuation in power at which said mobile communication terminal receives signals, wherein said minimum target SIR is varied in accordance with said fluctuation.

17. The method as set forth in claim 16, wherein said minimum target SIR is lowered when said fluctuation is smaller than a threshold fluctuation, and is raised when said fluctuation is greater than said threshold fluctuation.

18. The method as set forth in claim 11, further comprising detecting location of said mobile communication terminal, wherein said minimum target SIR is varied in accordance with said location.

19. The method as set forth in claim 18, wherein said minimum target SIR is lowered when fluctuation in said location is smaller than a threshold fluctuation, and is raised when fluctuation in said location is greater than said threshold fluctuation.

20. The method as set forth in claim 11, wherein said quality of the received signals and said target quality are expressed as a block error rate.

\* \* \* \* \*